United States Patent
Peters et al.

(10) Patent No.: US 6,320,357 B1
(45) Date of Patent: *Nov. 20, 2001

(54) CIRCUIT ARRANGEMENT

(75) Inventors: Henricus P. M. Peters; Arnold P. Stout; Paul R. Veldman, all of Oss (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/862,836

(22) Filed: May 23, 1997

Related U.S. Application Data

(63) Continuation of application No. 08/862,836, filed on May 23, 1997, which is a continuation of application No. 08/494,896, filed on Jun. 26, 1995.

(30) Foreign Application Priority Data

Jun. 28, 1994 (EP) .................................................. 94201859

(51) Int. Cl.$^7$ ...................................................... G05F 1/10
(52) U.S. Cl. ........................... 323/222; 323/224; 323/266
(58) Field of Search ................................... 323/222, 224, 323/225, 266; 363/37, 65, 52

(56) References Cited

U.S. PATENT DOCUMENTS

| | | | | |
|---|---|---|---|---|
| 5,019,952 | * | 5/1991 | Smolenski et al. | 363/16 |
| 5,179,508 | * | 1/1993 | Lange et al. | 363/16 |
| 5,402,331 | * | 3/1995 | Takahashi et al. | 363/89 |

FOREIGN PATENT DOCUMENTS

| | | | | |
|---|---|---|---|---|
| 323676B1 | 7/1989 | (EP) | | H05B/41/29 |

* cited by examiner

*Primary Examiner*—Shawn Riley
(74) *Attorney, Agent, or Firm*—Bernard Franzblau

(57) ABSTRACT

A circuit arrangement for supplying a load which comprises a discharge lamp. The circuit includes apparatus for generating a DC voltage and provided with input terminals for connection to a supply voltage source. A rectifier is coupled to the input terminals for rectifying an AC voltage supplied by the supply voltage source. In addition, there are output terminals for connection to the load and a DC-DC converter connected between the rectifier and the output terminals and provided with a first inductor, a first unidirectional element, and a switching element. The output terminals are interconnected by a circuit branch which comprises a series arrangement of an impedance and a first capacitor, which impedance is shunted by a further unidirectional element. As a result, the inrush current which flows immediately after switching-on of the circuit arrangement is limited.

24 Claims, 2 Drawing Sheets

CIRCUIT ARRANGEMENT

This is a continuation of application Ser. No. 08/862,836, filed May 23, 1997, which is a continuation of application Ser. No. 08/494,896, filed Jun. 26, 1995.

BACKGROUND OF THE INVENTION

This invention relates to a circuit arrangement for supplying a load which comprises a lamp, comprising means for generating a DC voltage provided with input terminals for connection to a supply voltage source, rectifying means coupled to the input terminals for rectifying an AC voltage supplied by the supply voltage source, output terminals for connection to the load, a DC-DC converter connected between the rectifying means and the output terminals and provided with first inductive means, a first unidirectional element, and a switching element, and first capacitive means coupled to the output terminals.

Such a circuit arrangement is known from European Patent 0323676. In the switching arrangement described therein, the output terminals are coupled to a DC-AC converter for generating a current of alternating polarity from the DC voltage, which current can be used for supplying a lamp. The switching element of the DC-DC converter is rendered in turn conducting and non-conducting with high frequency during lamp operation. As a result, a DC voltage is present across the first capacitive means, with which the DC-AC converter is supplied. The known circuit arrangement is highly suitable for operating lamps, more in particular discharge lamps such as low-pressure mercury lamps. A disadvantage of the known circuit arrangement, however, is that the first capacitive means are charged with a comparatively strong current when the circuit arrangement is switched on at a moment at which the supply voltage has a comparatively high value. This comparatively strong current, also called inrush current hereinafter, can adversely affect the life of the first capacitive means and the life of other components which carry this current. If the supply voltage source comprises a safety cut-out, a comparatively high inrush current may also cause the safety cut-out to interrupt the supply voltage.

SUMMARY OF THE INVENTION

The invention has for its object to provide a circuit arrangement with which the amplitude of the current charging the first capacitive means immediately after switching-on of the circuit arrangement can be limited.

According to the invention, a circuit arrangement as described in the opening paragraph is for this purpose characterized in that the output terminals are interconnected by a circuit branch which comprises a series arrangement of an impedance and the first capacitive means, which impedance is shunted by a further unidirectional element. When a circuit arrangement according to the invention is switched on, the current charging the first capacitive means flows through the impedance. Since this inrush current flows in the reverse direction of the further unidirectional element, the first unidirectional element carries no current. It is possible to limit said current to a desired value in that the impedance value is suitably chosen. It is achieved thereby that the inrush current is comparatively low. This comparatively low inrush current has a favourable effect on the life of the first capacitive means and of other components of the circuit arrangement which carry this inrush current. The comparatively low inrush current also prevents any safety cut-out which forms part of the supply voltage source from interrupting the supply voltage. If power is transmitted to the load from the first capacitive means, the current supplying this power flows substantially through the further unidirectional element, so that comparatively little power is dissipated in the impedance. During stationary operation, a periodic charging current with a frequency twice the frequency of the AC voltage flows through the first capacitive means and the impedance, so that a finite power dissipation takes place in the impedance. It was found, however, that this power dissipation is comparatively small when the AC voltage is sinusoidal and the switching element of the DC-DC converter is so controlled that also a sinusoidal current is taken up from the supply voltage source in phase with the AC voltage.

It should be noted that circuit arrangements are known, for example from Japanese Patent Applications 59-191476 and 63-107457, which also comprise rectifying means and output terminals for connecting a load interconnected by a first circuit comprising a series arrangement of an impedance and capacitive means, while the impedance is shunted by a unidirectional element. In these circuit arrangements, however, no DC-DC converter is coupled between the rectifying means and the output terminals, as it is in a circuit arrangement according to the invention. When such circuit arrangements are supplied with a sinusoidal supply voltage, a peak-shaped periodic current is taken up from the supply voltage source. When a circuit arrangement according to the invention is supplied with a sinusoidal AC voltage, however, it is possible to cause the current taken up from the supply voltage source to be also approximately sinusoidal in shape and approximately in phase with the supply voltage through adjustment of the duty cycle of the switching element of the DC-DC converter. The peak shape of the current during stationary lamp operation leads to a comparatively high power dissipation in the impedance, in contrast to stationary lamp operation when a circuit arrangement according to the invention is used. The circuit arrangements described in Japanese Patent Applications 59-191476 and 63-107457 use the power supplied by the supply voltage source less efficiently than does a circuit arrangement according to the invention.

Good results were achieved with circuit arrangements according to the invention in which the impedance comprises an ohmic resistor or an inductive element.

An advantageous embodiment of a circuit arrangement according to the invention is characterized in that the DC-DC converter comprises a boost converter, also referred to as an up-converter. If the DC voltage present during stationary lamp operation between the output terminals is higher than the maximum amplitude of the AC voltage supplied by the supply voltage source, the boost converter is active over the entire range of the instantaneous amplitude of the full-wave rectified AC voltage which forms the input voltage for the DC-DC converter, so that the DC-DC converter may be of a comparatively simple construction. It can also be realised in a comparatively simple manner through adjustment of the duty cycle of the switching element that the current taken up from the supply voltage source is also approximately sinusoidal and approximately in phase with the AC voltage. The advantageous embodiment as a result has a high power factor, while the power dissipation in the impedance is comparatively low during stationary operation.

A further advantageous embodiment of a circuit arrangement according to the invention is characterized in that the circuit arrangement in addition comprises a DC-AC converter, coupled to the output terminals, for generating a current of alternating polarity. Since the load comprises a lamp, it is often desirable to supply this load with a current of alternating polarity. This prevents, for example, cataphoresis or an unequal load on the lamp electrodes in the case of discharge lamps. Especially when the frequency of this current of alternating polarity is comparatively high, it is advantageous when the circuit branch in addition comprises further inductive means, and the circuit arrangement comprises further capacitive means shunting the circuit branch. These further inductive means and further capacitive means together form a filter by which the quantity of power dissipated in the impedance and in the first capacitive means by the current of alternating polarity is limited to a comparatively small quantity. If the impedance comprises an inductive element, it is possible to integrate this inductive element with the further inductive means into one component. If the impedance comprises an ohmic resistor, an integration of this ohmic resistor with the further inductive means into one component is also possible. This integration may be realised by means of a coil with an air core and (consequently) comparatively many turns. Owing to the many turns, such a coil has a comparatively high ohmic resistance in addition to a certain self-inductance.

Another advantageous embodiment of a circuit arrangement according to the invention is characterized in that the impedance is shunted by a switching element. By making the switching element conductive after the inrush current has charged the first capacitive means, substantially no power is dissipated in the impedance during stationary lamp operation because the charging current of the first capacitive means flows mainly through the switching element.

BRIEF DESCRIPTION OF THE DRAWINGS

Embodiments of the invention will be explained in more detail with reference to a drawing, in which.

DESCRIPTION OF THE PREFERRED EMBODIMENTS

Figure 1:
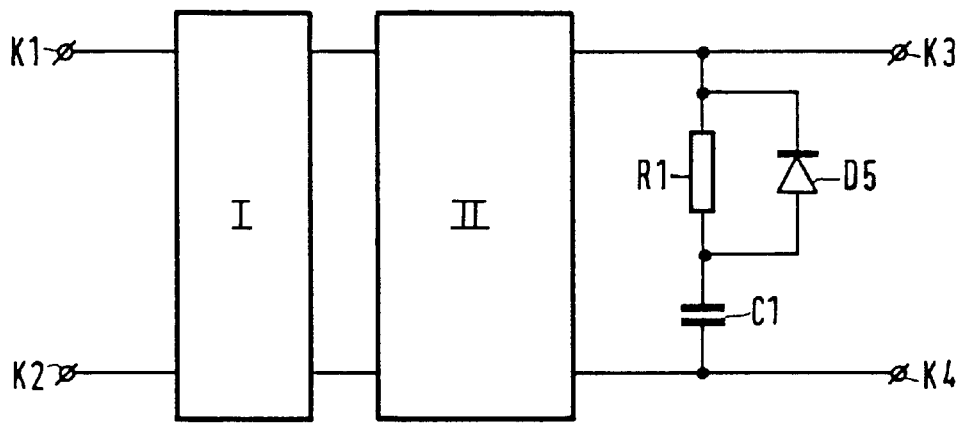
FIGS. 1, 2 and 3 show first, second and third embodiments of circuit arrangements according to the invention.

In FIG. 1, K1 and K2 form input terminals for connection to a supply voltage source. I are rectifying means coupled to the input terminals for rectifying an AC voltage supplied by the supply voltage source. Output terminals of rectifying means I are connected to respective input terminals of a DC-DC converter II. The construction of the DC-DC converter is not shown in FIG. 1. The DC-DC converter comprises a switching element, first inductive means, and a first unidirectional element. Output terminals K3 and K4 of the DC-DC converter II form output terminals of the means for generating a DC voltage for the connection of a load and are interconnected by a series arrangement of resistor R1 and capacitor C1 which in this embodiment form an impedance and first capacitive means, respectively. Resistor R1 is shunted by diode D5 which in this embodiment forms a further unidirectional element. Resistor R1 and capacitor C1 in this embodiment form a circuit branch.

The operation of the circuit shown in FIG. 1 is as follows. When the terminals K1 and K2 are connected to a supply voltage source which delivers an AC voltage, this AC voltage is rectified by the rectifying means I during stationary operation of the circuit arrangement. The rectified AC voltage is converted by the DC-DC converter into an output DC voltage consisting of a substantially constant DC voltage with a periodic voltage superimposed thereon with a frequency which is equal to twice the frequency of the AC voltage. This periodic voltage is caused by the alternation of charging of the capacitor C1 through resistor R1 and discharging of the capacitor C1 through diode D5. The load is supplied with the discharging current of capacitor C1. Immediately after connection of the input terminals K1 and K2 to the supply voltage source, however, no or only a comparatively low voltage is present across capacitor C1, so that a comparatively strong current is taken up from the supply voltage source in order to charge the capacitor C1 until the output DC voltage is reached. The amplitude of the comparatively strong current is limited because this comparatively strong current flows through the resistor R1. This limitation takes place to such a level that it achieves that the comparatively strong current has no detrimental influence on the life of components of the circuit arrangement. The limitation also achieves that any safety cut-out forming part of the supply voltage source will not interrupt the supply voltage.

Figure 2:
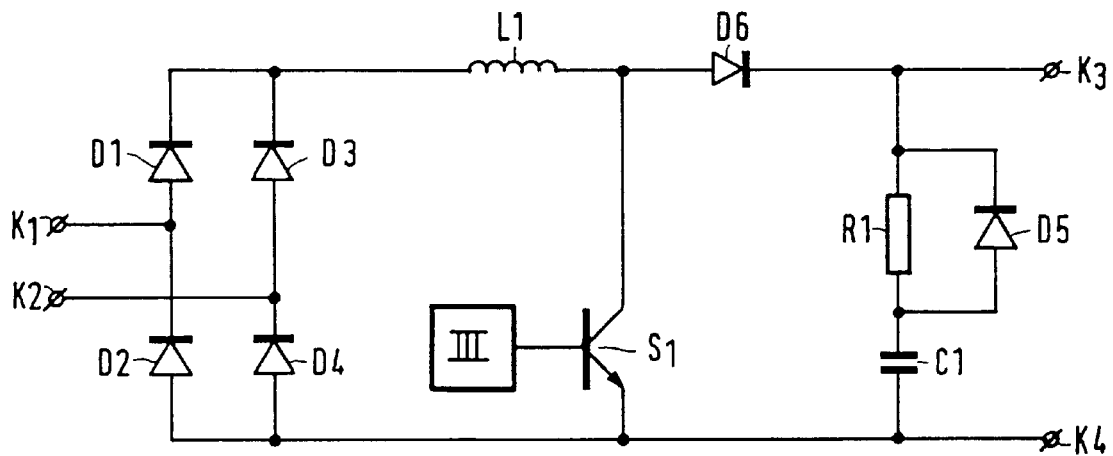

In FIG. 2, components having the same reference symbols as those used in FIG. 1 are identical to the corresponding components in FIG. 1. Diodes D1, D2, D3 and D4 form a diode bridge which in this embodiment forms rectifying means coupled to the input terminals. Control signal generator III, switching element S1, diode D6 and coil L1 together form a DC-DC converter of the boost converter type, connected between the rectifying means and the output terminals. Diode D6 and coil L1 form a first unidirectional element and first inductive means, respectively.

During stationary operation of the embodiment shown in FIG. 2, the control signal generator generates a high-frequency control signal for rendering the switching element S1 conducting and non-conducting. This transmutes the rectified AC voltage into the output DC voltage. The duty cycle of the control signal is proportional to the instantaneous value of the rectified AC voltage in order to improve the power factor of the circuit arrangement. This achieves at the same time that the power dissipated in the impedance is comparatively small during stationary lamp operation. The average value of the output AC voltage is also controlled through the duty cycle of the control signal. The circuit components which are necessary for realising these two control functions are not shown in FIG. 2.

Figure 3:
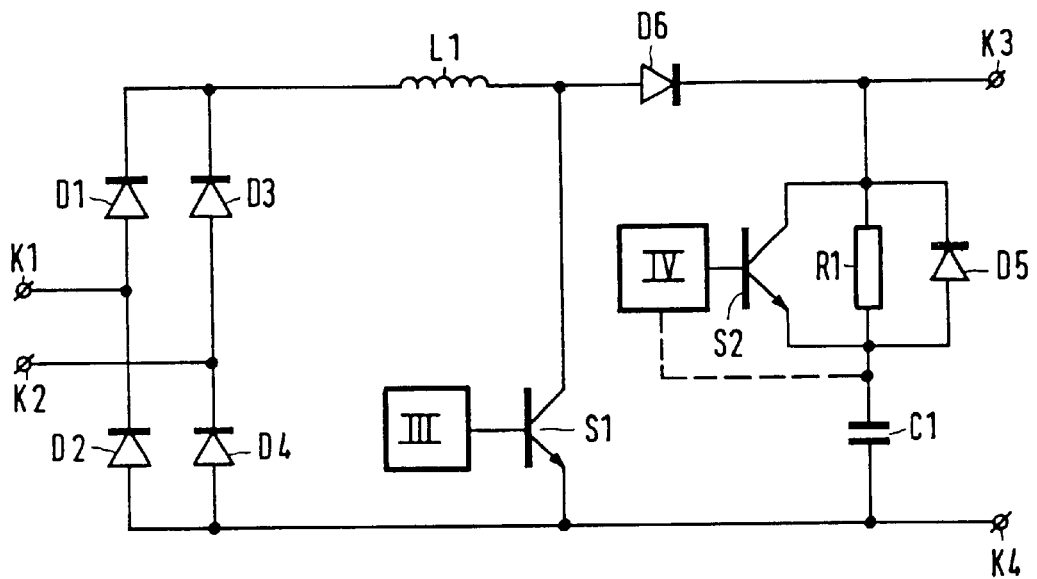

The circuit arrangement shown in FIG. 3 comprises, besides the circuit components corresponding to those also forming part of the circuit arrangement shown in FIG. 2, a switching element S2 which shunts the resistor R1. The circuit arrangement also comprises a control circuit IV coupled to a control electrode of switching element S2. An input of control circuit IV is coupled to a common junction point of capacitor C1 and resistor R1. This coupling is indicated with a broken line in FIG. 3. Immediately after the input terminals K1 and K2 have been connected to the supply voltage source, the switching element S2 is non-conducting and accordingly does not conduct the comparatively strong current with which capacitor C1 is charged. Once capacitor C1 has been charged to a voltage level at which the charging current of capacitor C1 has only a comparatively small amplitude, control circuit IV renders the switching element S2 conducting so that the capacitor C1 is charged mainly through the switching element S2 during stationary operation, whereby power dissipation in resistor R1 during stationary operation is prevented. The operation of the circuit arrangement shown in FIG. 3 corresponds to that of the circuit arrangement shown in FIG. 2 in all other respects.

Figure 4:
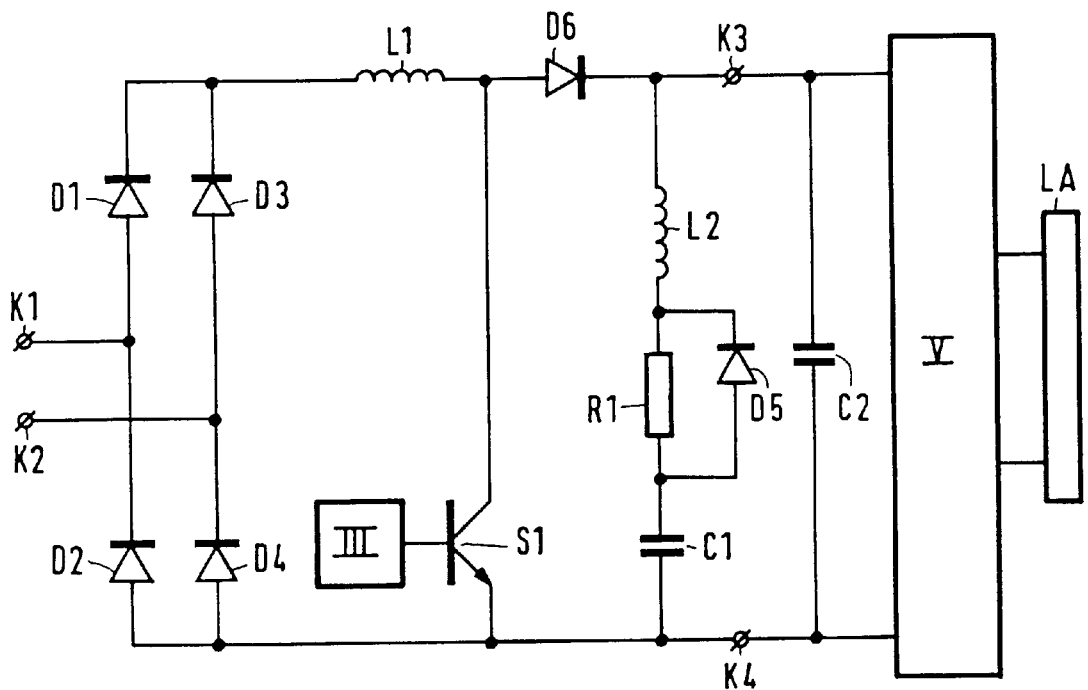
FIG. 4 shows an embodiment of a circuit arrangement according to the invention coupled to a load consisting of a DC-AC converter and a lamp coupled to this converter.

The circuit arrangement shown in FIG. 4 differs from that shown in FIG. 2 in that a coil L2 is included in series with resistor R1 and forms further inductive means in this embodiment. Output terminals K3 and K4 are in addition interconnected through a capacitor C2. The capacitor C2 in this embodiment forms further capacitive means. The output terminals K3 and K4 are connected to respective inputs of DC-AC converter V. A lamp La is connected to output terminals of the DC-AC converter V.

As is the case in the circuit arrangements shown in the other Figures, the current with which capacitor C1 is charged is limited by resistor R1 immediately after the connection of the input terminals K1 and K2 to the supply voltage source. The DC-AC converter generates a high-frequency current with which the lamp is supplied during stationary operation. The generation of the high-frequency current by the DC-AC converter causes a high-frequency voltage component to be present across capacitor C1 and resistor R1 during stationary lamp operation. This high-frequency voltage component gives rise to a further power dissipation in capacitor C1 and resistor R1. Coil L2 and capacitor C2, however, act as a high-frequency filter, so that the amplitude of the high-frequency voltage component is comparatively low, as is the power dissipation caused by this voltage component.

In a concrete realisation of the circuit arrangement shown in FIG. 4, with which a discharge lamp with a power rating of 100 W is operated by means of a high-frequency current with a frequency of approximately 45 kHz, the capacitance of capacitor C1 was 22 $\mu$F. The resistance of R1 was approximately 20 Ohms, the self-inductance of coil L2 was 400 $\mu$H, and the capacitance of capacitor C2 was 180 nF. The circuit arrangement was supplied with a sinusoidal AC voltage with an effective value of 230 V. The duty cycle of the switching element of the up-converter was proportional to the instantaneous amplitude of the full-wave rectified AC voltage. It was found that the inrush current was satisfactorily limited by the resistor R1. It was also found that the power dissipated in the resistor during stationary lamp operation was no more than approximately 0.34 W. The power dissipated in the resistor during stationary lamp operation was approximately 1.95 W when the resistor R1, the capacitor C1, and the diode D5 were directly connected to the output of the diode bridge and the filter comprising coil L2 and capacitor C2 was omitted.

What is claimed is:

1. A circuit arrangement for supplying a load comprising a discharge lamp from an AC supply voltage source at a high power factor, comprising means for generating a DC voltage provided with
    input terminals for connection to an AC supply voltage source,
        rectifying means coupled to the input terminals for rectifying an AC voltage supplied by the AC supply voltage source,
    output terminals for connection to the load,
    a DC-DC converter connected between the rectifying means and the output terminals and provided with first inductive means, a first unidirectional element and a switching element, and
characterized in that the output terminals are interconnected by a circuit branch which comprises a series arrangement of an impedance and first capacitive means, which impedance is shunted by a further unidirectional element,
    whereby the current taken up from the AC supply voltage source is approximately sinusoidal in shape and approximately in phase with the AC voltage.

2. A circuit arrangement as claimed in claim 1, wherein the impedance comprises an ohmic resistor operative to limit inrush of charging current to said first capacitive means upon turn-on of said circuit.

3. A circuit arrangement as claimed in claim 1, wherein the impedance comprises an inductive element.

4. A circuit arrangement as claimed in claim 3 wherein the DC-DC converter comprises a boost converter.

5. A circuit arrangement as claimed in claim 4, wherein the circuit arrangement further comprises a DC-AC converter coupled to the output terminals for generating a current of alternating polarity.

6. A circuit arrangement as claimed in claim 5, wherein the circuit branch further comprises further inductive means, and the circuit arrangement comprises further capacitive means which shunt the circuit branch.

7. A circuit arrangement as claimed in claim 6, wherein the impedance further inductive means have been integrated into one component.

8. A circuit arrangement as claimed in claim 6, wherein the impedance is shunted by a second switching element.

9. A circuit arrangement as claimed in claim 2, wherein the DC-DC converter comprises a boost converter.

10. A circuit arrangement as claimed in claim 1, wherein the DC-DC converter comprises a boost converter.

11. A circuit arrangement as claimed in claim 1, wherein the circuit arrangement in addition comprises a DC-AC converter coupled to the output terminals for generating a current of alternating polarity.

12. A circuit arrangement as claimed in claim 2, wherein the impedance is shunted by a second switching element.

13. A circuit for supplying a DC voltage to a load that includes a discharge lamp from an AC supply voltage source and at a high power factor, comprising:
    input terminals for connection to an AC supply voltage source;
    rectifying means coupled to the input terminals for rectifying an AC voltage supplied by the AC supply voltage source;
    output terminals for connection to the load that includes a discharge lamp;
    a DC-DC boost converter connected between the rectifying means and the output terminals and provided with a first inductive means, a first unidirectional element and a switching element;
    a series arrangement of an impedance and a first capacitive means connected across the output terminals, the impedance being shunted at least in part by a further unidirectional element, and
    means for controlling the operation of the switching element such that the current taken up from the AC supply voltage source is approximately sinusoidal in shape and approximately in phase with the AC voltage.

14. A circuit for supplying a DC voltage to a load that includes a discharge lamp from an AC supply voltage source and at a high power factor, comprising:
    input terminals for connection to an AC supply voltage source;
    rectifying means coupled to the input terminals for full-wave rectifying an AC voltage supplied by the AC supply voltage source, the AC voltage supplied by the AC supply voltage source having a maximum amplitude;

output terminals for connection to a load that includes a discharge lamp;

a series arrangement of an impedance and a first capacitive means connected across the output terminals, the impedance being shunted at least in part by a unidirectional element, the first capacitive means receiving charging current from said rectifying means; and a DC-DC boost converter connected between the rectifying means and the output terminals for receiving the full-wave rectified AC voltage and converting the full-wave rectified AC voltage to a substantially constant DC voltage across said first capacitive means with an approximately sinusoidal voltage superimposed thereon, the substantially constant DC voltage across the first capacitive means being higher during stationary lamp operation than the maximum amplitude of the AC voltage supplied by the AC supply voltage source, said impedance acting to limit inrush of charging current to said first capacitive means upon turn-on of said circuit and being effectively bypassed by said first unidirectional element during stationary lamp operation to minimize power dissipation from said impedance during stationary lamp operation, whereby the current taken up from the AC supply voltage source is approximately sinusoidal in shape and approximately in phase with the AC voltage.

15. A circuit as claimed in claim 14 wherein the DC-DC converter has a duty cycle proportional to the instantaneous amplitude of the full-wave rectified AC voltage.

16. A circuit arrangement as claimed in claim 1 wherein the circuit branch further comprises, in series, a second inductive means, and a second capacitive means coupled in parallel with the circuit branch.

17. A circuit arrangement as claimed in claim 1 further comprising a second switching element coupled in shunt with the impedance element.

18. A circuit as claimed in claim 13 wherein said controlling means controls the duty cycle of the switching element when the AC supply voltage is at its nominal operation value.

19. A circuit arrangement as claimed in claim 1 further comprising means for controlling the operation of the switching element so as to make the current taken up from the AC supply voltage source approximately sinusoidal in shape and approximately in phase with the AC voltage.

20. A circuit arrangement as claimed in claim 19 wherein the switching element comprises a field effect transistor.

21. A circuit arrangement as claimed in claim 17 wherein the further unidirectional element is a diode reversely polarized with respect to a DC voltage at the output terminals and the second switching element comprises a transistor oppositely polarized with respect to said diode.

22. A circuit as claimed in claim 13 further comprising a second switching element coupled in shunt with the impedance element, and a control circuit for the second switching element which holds it in a non-conductive state when the first capacitive means is in a discharged state and which drives it into a conductive state during stationary operation of a discharge lamp.

23. A circuit as claimed in claim 13 further comprising a second switching element coupled in shunt with the impedance element, wherein the second switching element comprises a MOSFET device.

24. A circuit as claimed in claim 14 wherein said inrush of charging current also flows through an inductive means of the DC-DC boost converter and which inductive means further limits the inrush of charging current to the first capacitive means.

* * * * *